United States Patent
Katakawa

(10) Patent No.: US 10,282,482 B2
(45) Date of Patent: May 7, 2019

(54) DATA PROVISION DEVICE, DATA PROVISION METHOD, AND DATA PROVISION PROGRAM

(71) Applicant: RAKUTEN, INC., Setagaya-ku, Tokyo (JP)

(72) Inventor: Jun Katakawa, Tokyo (JP)

(73) Assignee: Rakuten, Inc., Setagaya-ku, Tokyo (JP)

(*) Notice: Subject to any disclaimer, the term of this patent is extended or adjusted under 35 U.S.C. 154(b) by 597 days.

(21) Appl. No.: 14/778,205

(22) PCT Filed: Mar. 29, 2013

(86) PCT No.: PCT/JP2013/059511
§ 371 (c)(1),
(2) Date: Sep. 18, 2015

(87) PCT Pub. No.: WO2014/155663
PCT Pub. Date: Oct. 2, 2014

(65) Prior Publication Data
US 2016/0147902 A1 May 26, 2016

(51) Int. Cl.
*G06F 12/0862* (2016.01)
*G06F 17/30* (2006.01)

(52) U.S. Cl.
CPC .... *G06F 17/30902* (2013.01); *G06F 12/0862* (2013.01); *G06F 17/30905* (2013.01); *G06F 2212/6024* (2013.01)

(58) Field of Classification Search
None
See application file for complete search history.

(56) References Cited

U.S. PATENT DOCUMENTS

| 2002/0078165 A1* | 6/2002 | Genty | G06F 17/30902 709/217 |
| 2012/0239732 A1* | 9/2012 | Liang | G06F 17/30899 709/203 |

FOREIGN PATENT DOCUMENTS

| JP | 2000-148644 A | 5/2000 |
| JP | 2004-171264 A | 6/2004 |
| JP | 2004-280405 A | 10/2004 |
| JP | 2007-310446 A | 11/2007 |

OTHER PUBLICATIONS

System Administration Commands 1997, Hewlett Packard, Release 11.0 vol. 2, 1M86 to 1M87.*

(Continued)

*Primary Examiner* — Jason G Liao
(74) *Attorney, Agent, or Firm* — Sughrue Mion, PLLC

(57) ABSTRACT

A data provision device includes a determination unit that determines at least some of selectable items contained in a web page to be provided to a user terminal as a prefetch item based on an event that can occur in the user terminal to which the web page is provided, a generation unit that generates a data set composed of a group of data to be transmitted to the user terminal according to selection of the prefetch item determined by the determination unit, and a transmitting unit that, when selection of an item is received from the user terminal, transmits a data set corresponding to the item and generated by the generation unit to the user terminal.

12 Claims, 9 Drawing Sheets

| NUMBER OF VARIATIONS OF RECORDS IN SEARCH RESULT | OPERATION PATTERN | NUMBER OF TIMES |
|---|---|---|
| 5~ | SELECTION OF RECORD 1 | 50 |
| 5~ | SELECTION OF RECORD 2 | 45 |
| 5~ | SELECTION OF RECORD 3 | 40 |
| 5~ | SELECTION OF RECORD 4 | 30 |
| 5~ | SELECTION OF RECORD 5 | 25 |
| 5~ | DISPLAY OF NEXT PAGE | 40 |
| 5~ | SORTING BY PRICE | 20 |
| 2~4 | SELECTION OF RECORD 1 | 40 |
| 2~4 | SELECTION OF RECORD 2 | 35 |
| 2~4 | SELECTION OF RECORD 3 | 30 |
| 2~4 | SELECTION OF RECORD 4 | 28 |
| 2~4 | SORTING BY PRICE | 8 |
| 1 | SORTING BY PRICE | 45 |
| ⋮ | ⋮ | ⋮ |

(56) References Cited

OTHER PUBLICATIONS

Ronan et al., Allow setting scheduled time similar to cron job and comment #1 2011, drupal.org, https://www.drupal.org/project/backup_migrate/issues/313134.*
Buckler, How to Create Scheduled Events in MySQL Jul. 20, 2011, sitepoint.com, https://www.sitepoint.com/how-to-create-mysql-events/.*
Stefanelli et al., Filter by Count(*)? Apr. 14, 2011, stackoverflow.com, https://stackoverflow.com/questions/5664103/filter-by-count.*
Communication from International Searching Authority dated Oct. 8, 2015 in International Patent Application No. PCT/JP2013/059511.

* cited by examiner

*Fig.4*

| | c1 | c2 | c3 | c4 |
|---|---|---|---|---|
| | No. ▲ | Name | Price | Shop |
| r1 | 1 | AAA | 1200 | ppp |
| r2 | 2 | CCC | 800 | qqq |
| r3 | 3 | BBB | 900 | rrr |
| r4 | 4 | DDD | 1100 | sss |
| r5 | 5 | FFF | 950 | ttt | c5: 5 ▼ search

First | Previous | 1 | 2 | 3 | 4 | 5 | Next | Last p1  p2  p3  p4  p5

*Fig.5*

| FIRST OPERATION PATTERN | SECOND OPERATION PATTERN | NUMBER OF TIMES |
|---|---|---|
| SEARCH RESULT LIST | SELECTION OF RECORD 1 | 50 |
| SEARCH RESULT LIST | SELECTION OF RECORD 2 | 30 |
| SEARCH RESULT LIST | SORTING BY PRICE | 25 |
| SELECTION OF RECORD 1 | SELECTION OF RECORD 2 | 20 |
| SELECTION OF RECORD 2 | SELECTION OF RECORD 3 | 10 |
| SELECTION OF RECORD 3 | DISPLAY OF NEXT PAGE | 5 |
| ⋮ | ⋮ | ⋮ |

SEARCH CRITERIA: DIGITAL CAMERA, GPS — d11

| No. | Name | model No. | Price |
|---|---|---|---|
| 1 | AAA | A111 | 25000 |
| 2 | CCC | ABC | 22000 |
| 3 | BBB | B-101 | 35000 |
| 4 | DDD | 99D | 27000 |
| 5 | FFF | fff | 30000 | r1 → row 1, r2 → row 2, r3 → row 3, r4 → row 4, r5 → row 5 c11 (header)

First | Previous | 1 | 2 | 3 | 4 | 5 | Next | Last   — p11

(b)

SEARCH CRITERIA: A111 — d21

| No. | Name | model No. | Price |
|---|---|---|---|
| 1 | AAA | A111 | 25000 |
| 2 | AAA | A111 | 22000 |
| 3 | AAA | A111 | 35000 |
| 4 | AAA | A111 | 27000 |
| 5 | AAA | A111 | 30000 | c21 (header)

First | Previous | 1 | 2 | 3 | 4 | 5 | Next | Last

Fig.7

| NUMBER OF VARIATIONS OF RECORDS IN SEARCH RESULT | OPERATION PATTERN | NUMBER OF TIMES |
|---|---|---|
| 5~ | SELECTION OF RECORD 1 | 50 |
| 5~ | SELECTION OF RECORD 2 | 45 |
| 5~ | SELECTION OF RECORD 3 | 40 |
| 5~ | SELECTION OF RECORD 4 | 30 |
| 5~ | SELECTION OF RECORD 5 | 25 |
| 5~ | DISPLAY OF NEXT PAGE | 40 |
| 5~ | SORTING BY PRICE | 20 |
| 2~4 | SELECTION OF RECORD 1 | 40 |
| 2~4 | SELECTION OF RECORD 2 | 35 |
| 2~4 | SELECTION OF RECORD 3 | 30 |
| 2~4 | SELECTION OF RECORD 4 | 28 |
| 2~4 | SORTING BY PRICE | 8 |
| 1 | SORTING BY PRICE | 45 |
| ⋮ | ⋮ | ⋮ |

DATA PROVISION DEVICE, DATA PROVISION METHOD, AND DATA PROVISION PROGRAM

CROSS REFERENCE TO RELATED APPLICATIONS

This application is a National Stage of International Application No. PCT/JP2013/059511, filed Mar. 29, 2013, the contents of which are incorporated herein by reference in its entirety.

TECHNICAL FIELD

The present invention relates to a data provision device, a data provision method, and a data provision program.

BACKGROUND ART

In acquisition of information through the Internet, a prefetching technique that a user terminal acquires in advance data required to display a web page linked from a web page currently displayed on the user terminal in order to collect information efficiently is known. For example, a technique that a user terminal prefetches data of a web page according to a priority based on a level of importance indicated by a user and a viewing history is known (for example, see Patent Literature 1).

CITATION LIST

Patent Literature

PTL 1: Japanese Unexamined Patent Application Publication No. 2004-171264

SUMMARY OF INVENTION

Technical Problem

In the above-described related art, when a web server that provides data of a web page receives a request for prefetching from a user terminal, it starts generating data for displaying a web page related to the request and then transmits the generated data to the user terminal. Thus, it takes at least the time to generate data for prefetch in the web server until the user terminal obtains data of the web page. Accordingly, even when the user terminal prefetches data, the processing speed for the prefetch processing is limited by the time to generate data for prefetch in the web server.

In view of the above, an object of the present invention is to provide data linked from a web page to a user terminal more promptly.

Solution to Problem

To solve the above problem, a data provision device according to one aspect of the present invention includes a determination means configured to determine at least some of selectable items contained in a web page to be provided to the user terminal as a prefetch item based on an event that can occur in the user terminal to which the web page is provided and that can be determined based on information stored in a storage means accessible by the data provision device, a generation means configured to generate a data set composed of a group of data to be transmitted to the user terminal according to selection of the prefetch item determined by the determination means, and a transmitting means configured to, when selection of an item is received from the user terminal, transmit to the user terminal a data set corresponding to the item and generated by the generation unit.

A data provision method according to one aspect of the present invention is a data provision method in a data provision device for providing a web page in response to a request from a user terminal, the method including a determination step of determining at least some of selectable items contained in a web page to be provided to the user terminal as a prefetch item based on an event that can occur in the user terminal to which the web page is provided and that can be determined based on information stored in a storage means accessible by the data provision device, a generation step of generating a data set composed of a group of data to be transmitted to the user terminal according to selection of the prefetch item determined in the determination step, and a transmitting step of, when selection of an item is received from the user terminal, transmitting to the user terminal a data set corresponding to the item and generated in the generation step.

A data provision program according to one aspect of the present invention is a data provision program causing a computer to function as a data provision device for providing a web page in response to a request from a user terminal, the program causing the computer to implement a determination function to determine at least some of selectable items contained in a web page to be provided to the user terminal as a prefetch item based on an event that can occur in the user terminal to which the web page is provided and that can be determined based on information stored in a storage means accessible by the data provision device, a generation function to generate a data set composed of a group of data to be transmitted to the user terminal according to selection of the prefetch item determined by the determination function, and a transmitting function to, when selection of an item is received from the user terminal, transmit to the user terminal a data set corresponding to the item and generated by the generation function.

According to the above aspect, because the data provision device can recognize the content of a web page to be provided to the user terminal, it can generate a data set to be transmitted to the user terminal in advance according to selection of an item contained in the web page to be provided to the user terminal. Then, when selection of an item from the user terminal is received, the previously generated data set corresponding to the item is transmitted to the user terminal, and it is thereby possible to provide the data set to the user terminal without requiring the time to generate the data set. Further, in the technique that a user terminal prefetches data corresponding to a link item contained in a web page from a web server, prefetching of data is performed regardless of whether the item is actually selected or not, and therefore unnecessary traffic occurs in the network. On the other hand, in this embodiment, because the previously generated data set is transmitted to the user terminal according to selection of an item in the user terminal, traffic in the network can be reduced to the minimum necessary.

In a data provision device according to another aspect, the determination means may determine the prefetch item for the user terminal of a user based on the user's tendency of selecting an item on a web page, and the generation means may generate a data set for the prefetch item determined by the determination means.

According to this aspect, because the prefetch item is determined based on item selection tendency, it is possible to generate in advance a data set for the item that is likely to be selected.

In a data provision device according to another aspect, the determination means may determine the prefetch item based on an operation history about selection of an item on a web page.

According to this aspect, because the prefetch item is determined based on an operation history about selection of an item on a web page, it is possible to generate in advance a data set for the item that is more likely to be selected in the user terminal.

In a data provision device according to another aspect, when a first operation pattern related to a request including selection of an item is performed by the user terminal, the determination means may determine as the prefetch item an item selected in a second operation pattern having been performed after the first operation pattern at a frequency of a specified value or more in the operation history performed in the user terminal.

According to this aspect, because the item that is selected in the second operation pattern having been performed after the first operation pattern at a frequency of a specified value or more in the operation history performed in the user terminal is determined as the prefetch item, it is possible to generate in advance a data set for the item that is likely to be selected in the user terminal where the first operation pattern is performed.

In a data provision device according to another aspect, when, in response to a search request based on search criteria set in the user terminal, providing a search result including a plurality of records matching the search criteria as the web page to the user terminal, the determination means may determine the prefetch item based on an operation history of operations performed in the user terminal in accordance with variations of records in the search result.

When a search result for a search request is provided to the user terminal, a user tends to perform the following operation in accordance with variations of records in the search result. For example, when there are many variations of records in the search result, a user tends to perform an operation to select each record in order to refer to the details of each record. On the other hand, when there are only a few variations of records in the search result, a user tends to perform an operation to compare attribute information contained in each record, such as sorting, for example. According to the above aspect, because the prefetch item is determined based on an operation history of operations performed in the user terminal in accordance with variations of records included in a search result in response to a search request from the user terminal, it is possible to generate in advance a data set for the item that is likely to be selected in the search result.

In a data provision device according to another aspect, the generation means may generate a data set to be transmitted to the user terminal in response to selection of at least some of selectable items contained in a web page to be displayed on the user terminal based on one data set generated by the generation means as a data set in a next hierarchy of the one data set, and generate a data set in the number of hierarchies in accordance with a processing load of the data provision device.

In this data provision device, a data set to be transmitted to the user terminal in response to selection of at least some of selectable items contained in a web page to be displayed on the user terminal based on one generated data set can be further generated in advance as a data set in a next hierarchy. It is thereby possible to generate in advance data sets to be transmitted to the user terminal in response to selection of an item on a web page over a plurality of hierarchies. Because the number of hierarchies can be adjusted in accordance with the processing load of the data provision device, it is possible to reduce the processing load for generation of data sets in a plurality of hierarchies.

In a data provision device according to another aspect, the generation means may generate a data set for the number of user terminals accessing the data provision device in accordance with a processing load of the data provision device.

According to this aspect, because the number of user terminals which are accessing the data provision device and for which a data set is to be generated is adjusted in accordance with the processing load of the data provision device, it is possible to reduce the processing load when providing a data set to a plurality of user terminals.

In a data provision device according to another aspect, when sequentially generating a plurality of data sets for a plurality of prefetch items, the generation means may set a time interval to perform generation processing to a time in accordance with a processing load of the data provision device.

In this data provision device, data sets for a plurality of selectable items contained in a web page can be generated. According to this embodiment, when sequentially generating a plurality of data sets for a plurality of prefetch items, a time interval to perform generation processing is set to a time in accordance with a processing load of the data provision device, and it is thereby possible to reduce the processing load when sequentially generating a plurality of data sets.

In a data provision device according to another aspect, when, in response to a search operation based on search criteria set in the user terminal, providing a search result including a plurality of records matching the search criteria as the web page to the user terminal, the determination means may determine a record included in the search result as the prefetch item based on tendency of selection determined according to a search score indicating a degree of matching of a record with the search criteria.

According to this aspect, it is possible to generate a data set for the item that is likely to be selected by many users.

Advantageous Effects of Invention

According to one aspect of the present invention, it is possible to provide data linked from a web page to a user terminal more promptly.

BRIEF DESCRIPTION OF DRAWINGS

FIG. 4 is a view showing an example of a web page provided in response to a search request from a user terminal.

FIG. 5 is a view showing a configuration of an operation pattern table and an example of data stored therein.

FIG. 6 is a view showing an example of a web page provided in response to a search request from a user terminal.

FIG. 7 is a view showing an example of a table storing an operation history of operations performed in a user terminal in accordance with variations of records in a search result.

DESCRIPTION OF EMBODIMENTS

An embodiment of the present invention is described hereinafter in detail with reference to the appended drawings. Note that, in the description of the drawings, the same or equivalent elements are denoted by the same reference symbols, and the redundant explanation thereof is omitted.

Figure 1:
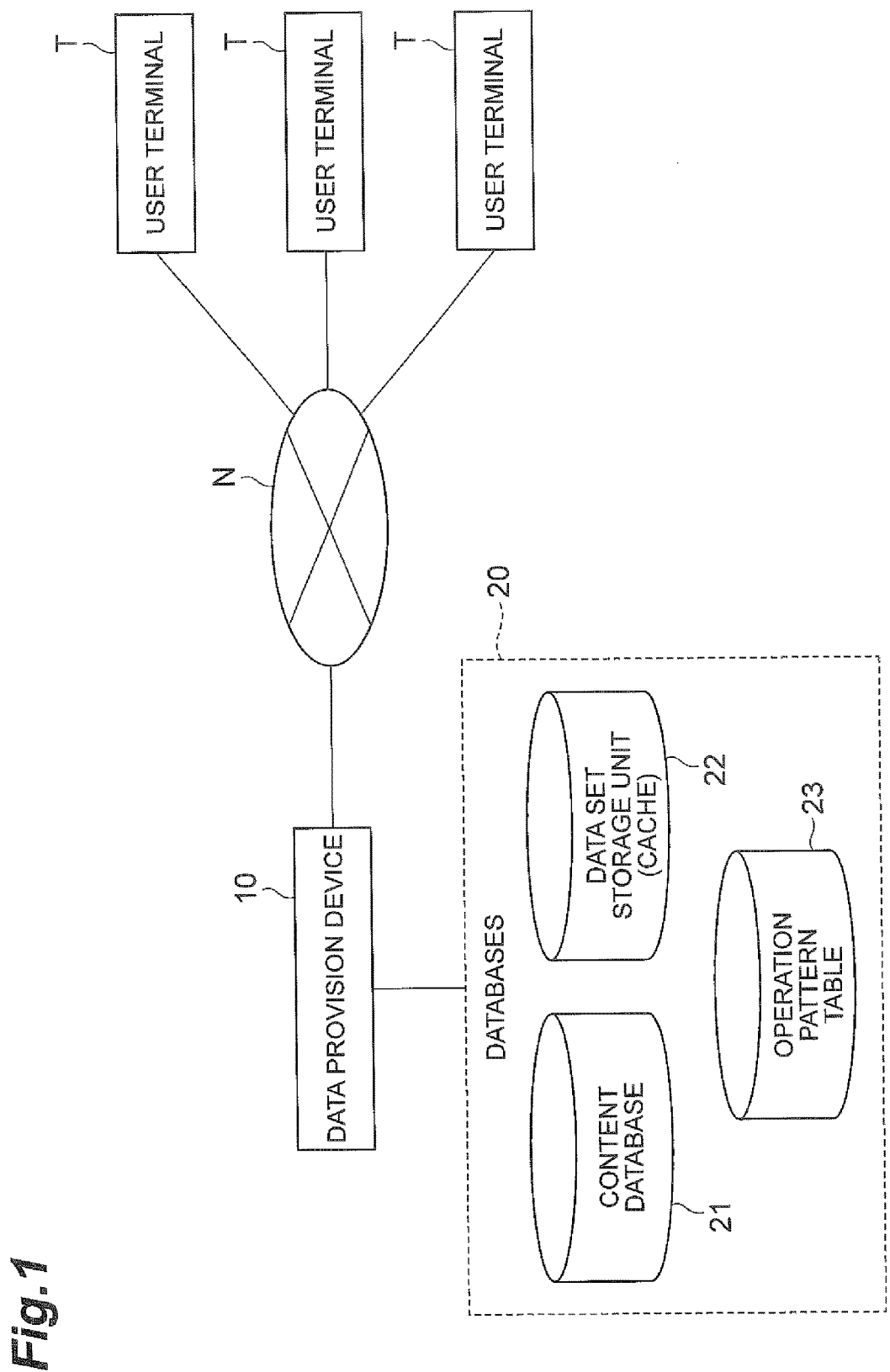
FIG. 1 is a view showing a configuration of a system including a data provision device.

FIG. 1 is a view showing a configuration of a data provision system 100 that includes a data provision device according to this embodiment. As shown in FIG. 1, the data provision system 100 includes a data provision device 1, user terminals T and databases 20. The user terminals T and the data provision device 1 are connected through a network N such as the Internet. The data provision device 1 can access the databases 20 through a network such as the Internet or a private line. Although three user terminals T are shown in FIG. 1, the number of user terminals T is not particularly limited. The databases 20 include a content database 21, a data set storage unit 22 as a cache, and an operation pattern table storage unit 23.

The content database 21 is a database that stores data which forms the content of a web page to be provided to and displayed on the user terminal T. The data set storage unit 22 is a storage means that caches a data set generated in advance by the data provision device 1 and to be provided to the user terminal T. The operation pattern table storage unit 23 stores an operation pattern table related to an operation history in the user terminal. The operation pattern table is described in detail later.

The variety of the user terminals T is not particularly limited, and it may be a stationary or portable personal computer, or a mobile terminal such as an advanced mobile phone (smart phone), a cellular phone or a personal digital assistant (PDA), for example.

Figure 2:
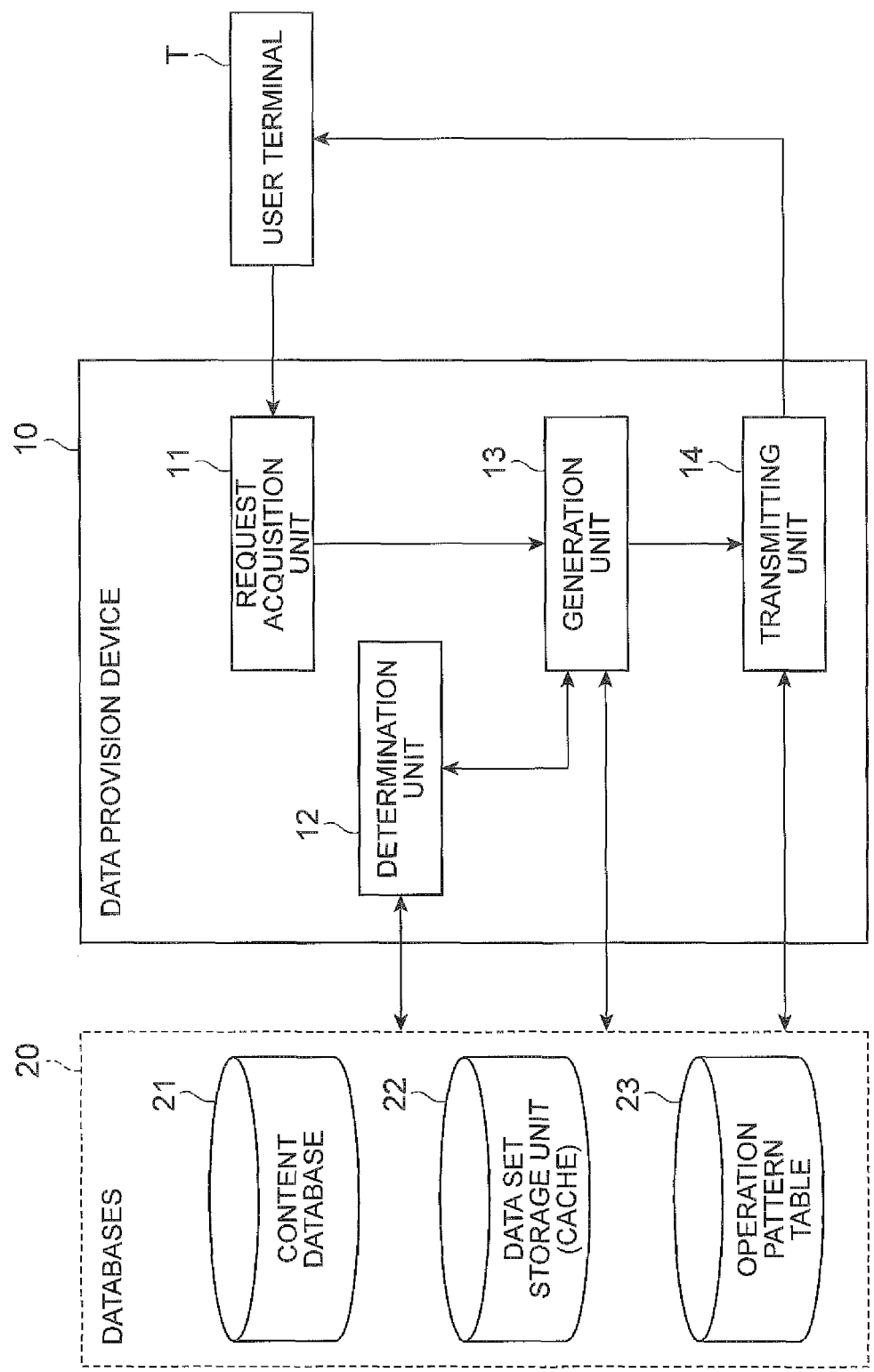
FIG. 2 is a block diagram showing a functional configuration of the data provision device.

FIG. 2 is a block diagram showing a functional configuration of the data provision device 1 according to this embodiment. The data provision device 1 is a device that provides a web page in response to a request from a user terminal, and it is a computer such as a server, for example.

To be more specific, according to the selection of items to be contained in a web page, the data provision device 1 can provide a data set composed of a group of data for displaying the web page corresponding to the selected items on the user terminal T. The group of data for displaying a web page is stored in the content database 21. A link is set to the items contained in the web page, for example. Further, in response to a search request based on search criteria set in the user terminal T, the data provision device 1 can generate a search result containing a plurality of records that match the search criteria by referring to the content database 21 and provide it as a web page to the user terminal T.

As shown in FIG. 2, the data provision device 1 according to this embodiment functionally includes a request acquisition unit 11, a determination unit 12 (determination means), a generation unit 13 (generation means), and a transmitting unit 14 (transmitting means). The functional units 11 to 14 of the data provision device 1 can access the databases 20.

Figure 3:
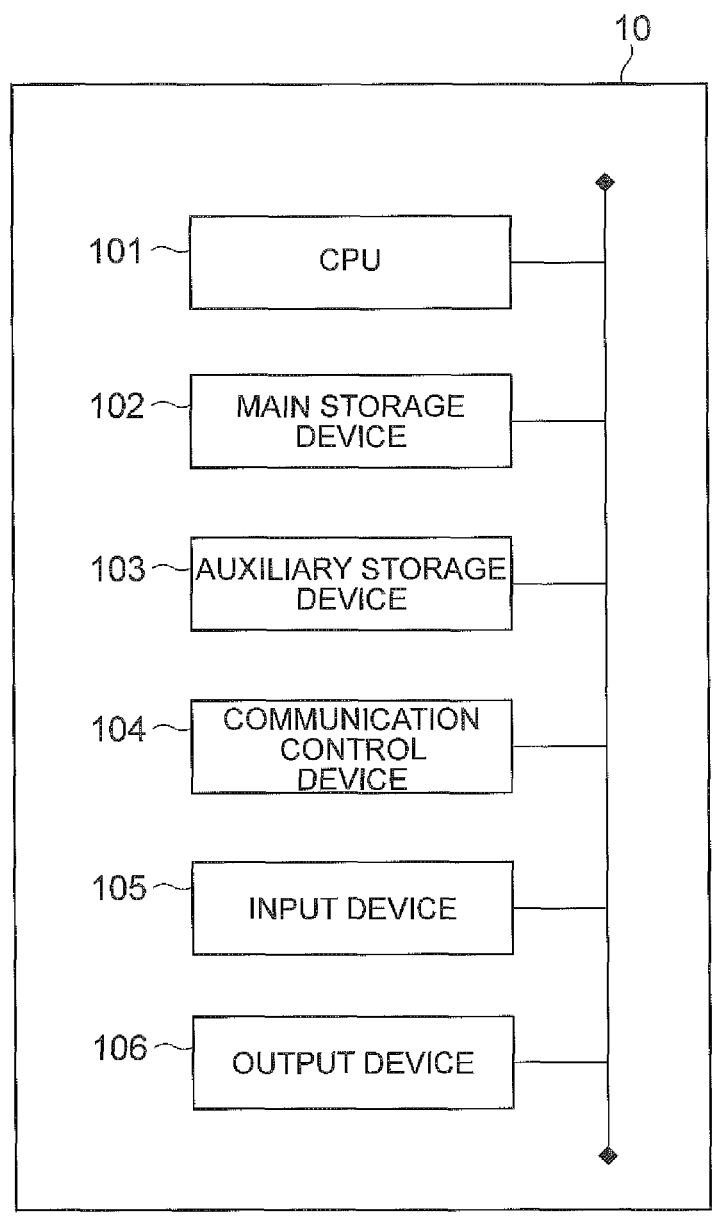
FIG. 3 is a view showing a hardware configuration of the data provision device.

FIG. 3 is a view showing a hardware configuration of the data provision device 1. As shown in FIG. 3, the data provision device 1 is physically configured as a computer system that includes a CPU 101, a main storage device 102 such as memory like RAM and ROM, an auxiliary storage device 103 such as a hard disk, a communication control device 104 such as a network card, an input device 105 such as a keyboard and a mouse, an output device 106 such as a display and the like.

The functions shown in FIG. 2 are implemented by loading given computer software (data provision program) onto hardware such as the CPU 101 or the main storage device 102 shown in FIG. 3, making the communication control device 104, the input device 105 and the output device 106 operate under control of the CPU 101, and performing reading and writing of data in the main storage device 102 or the auxiliary storage device 103. Data and database required for the processing is stored in the main storage device 102 or the auxiliary storage device 103.

The functional units of the data provision device 1 are described hereinafter. The request acquisition unit 11 is a part that acquires various requests from the user terminals T. The various requests include a search request containing search criteria and a request for selection of a link contained in a web page.

When a search request, which is one example of a request from the user terminal T, is received, a search result containing records that match the search criteria is generated by the generation unit 13 by referring to the content database 21, and the generated search result is transmitted to the user terminal T by the transmitting unit 14. FIG. 4 is a view showing an example of a web page that displays a search result which is provided in response to a search request from the user terminal T. In the example shown in FIG. 4, the web page shows five records No. 1 to 5 as a search result and contains various selectable items. To be specific, the web page contains link items r1 to r5 to the detailed information of each record, sort items c1 to c4 for sorting records based on a value of attribute information, an operation item c5 for setting the number of records to be displayed, link items p1 to p5 for transitioning pages of a search result as the selectable items. In the user terminal T to which the web page is provided, an event such as selection of the link item, the sort item or the operation item can occur.

The determination unit 12 determines at least some of the selectable items contained in the web page to be provided to the user terminal T as a prefetch item based on an event that can occur in the user terminal to which the web page is provided and that can be determined based on information stored in a storage means accessible by the data provision device 1. Further, the generation unit 13 is a part that generates a data set composed of a group of data to be transmitted to the user terminal T according to the selection of the prefetch item determined by the determination unit 12. The prefetch item is an item for which a data set composed of a group of data to be transmitted to the user terminal T is generated in advance according to the selection of an item contained in the web page to be provided to the user terminal T. The generation unit 13 stores the generated data set into the data set storage unit 22.

The determination unit 12 can recognize the content of the web page to be transmitted in response to a request from the user terminal T before the web page is transmitted to the user terminal T as long as it is at least after the web page is generated. Thus, the generation unit 13 can generate the data set to be transmitted to the user terminal according to the selection of an item contained in the web page to be provided to the user terminal T in advance before the transmission of the web page.

The determination unit 12 can determine the prefetch item based on an event that can occur in the user terminal T and that can be determined based on information which can be acquired from the storage means. To be specific, the determination unit 12 can determine the prefetch item for the user terminal of a user based on the user's tendency of selecting an item in a web page, for example. A user of the user terminal T on which the web page shown in FIG. 4 is displayed may have the item selection tendency to select the link items r1 to r3 in order to refer to the detailed information of records, for example. Another user may have the item selection tendency to select the sort item c3. Further, another user may have the item selection tendency to select the link item p3 for transitioning pages. Such selection tendencies in a certain web page are previously stored in a storage means (not shown) of the databases 20, and the determination unit 12 can determine the prefetch item based on the selection tendencies stored in the storage means.

Further, the determination unit 12 can determine the prefetch item based on an operation history about selection of an item on a web page. Specifically, an operation history about selection of an item on a web page is previously stored in a storage means (not shown) of the databases 20, and the determination unit 12 can determine the prefetch item based on the operation history stored in the storage means.

To be specific, when a first operation pattern related to a request containing selection of an item is performed by the user terminal T, the determination unit 12 determines the item that is selected in a second operation pattern which has been performed after the first operation pattern at a frequency of a specified value or more in the operation history performed in the user terminal T as the prefetch item. FIG. 5 is a view showing a configuration of an operation pattern table stored in the operation pattern table storage unit and an example of data stored therein. The operation pattern table is a table that stores the number of times the second operation pattern has been performed after the first operation pattern related to a request containing selection of an item on the user terminal T, and it is previously generated based on the operation history performed in the user terminal T, for example. Note that the operation pattern table can be generated for each user. Further, in the case where the data provision device 1 is a server that forms an e-commerce site, the operation pattern table may be generated for each shop.

For example, the determination unit 12 may determine the item that is selected in the second operation pattern which has been performed 30 times or more after the first operation pattern on the user terminal T as the prefetch item. In the example of the web page shown in FIG. 4, a "search result list" as a result of performing an operation pattern such as a search request is displayed, for example. Then, by referring to the operation pattern table, because the second operation pattern which has been performed 30 times or more after the operation for displaying the search result list is performed as the first operation pattern is "selection of the record 1" and "selection of the record 2", the determination unit 12 determines the link item r1 of the record 1 and the link item r2 of the record 2 as the prefetch item.

Then, the generation unit 13 generates a data set composed of a group of data to be transmitted to the user terminal T according to the selection of the link item r1, which is a group of data for displaying the detailed information about the record 1, and stores the generated data set into the data set storage unit 22. Likewise, the generation unit 13 generates a data set composed of a group of data to be transmitted to the user terminal T according to the selection of the link item r2, which is a group of data for displaying the detailed information about the record 2, and stores the generated data set into the data set storage unit 22.

When selection of an item from the user terminal T is received, the transmitting unit 14 transmits a data set corresponding to the item that is generated by the generation unit 13 and stored in the data set storage unit 22 to the user terminal T. To be specific, when the link item r1 is selected in the user terminal T on which the web page shown in FIG. 4 is displayed, the request acquisition unit 11 receives the selection of the link item r1, the generation unit 13 extracts the previously generated data set for displaying the detailed information about the record 1 from the data set storage unit 22, and the transmitting unit 14 transmits the data set for the record 1 to the user terminal T. Therefore, it is possible to provide the data set to the user terminal T without requiring the time to generate the data set.

Further, because the technique that the user terminal T prefetches data corresponding to a link item contained in a web page from a web server performs prefetching of data regardless of whether the link item is actually selected or not, unnecessary traffic occurs in the network. On the other hand, in the data provision device 1 according to this embodiment, because the previously generated data set is transmitted to the user terminal T in response to the selection of a link item in the user terminal T, traffic in the network N can be reduced to the minimum necessary.

Note that, when an item other than the link item r1 and the link item r2 is selected, the generation unit 13 generates the corresponding data set upon receiving the selection, and the transmitting unit 14 transmits the generated data set.

Further, when, in response to a search request based on search criteria set in the user terminal T, providing a search result containing a plurality of records that match the search criteria as a web page to the user terminal T, the determination unit 12 may determine the prefetch item based on an operation history of operations performed in the user terminal T in accordance with variations of records in a search result. Such processing of determining the prefetch item is described hereinafter with reference to FIGS. 6 and 7.

FIGS. 6(*a*) and 6(*b*) are views showing an example of a web page that is provided in response to a search request from the user terminal T. In the example of FIG. 6(*a*), the web page shows a result of searching with a generic name of a product and a word about a function such as "digital camera, GPS" as search criteria d11. This search result includes many variations of records as shown in the records No. 1 to No. 5. As in this case, when there are many variations of records in a search result, a user tends to perform an operation to select each record, for example, in order to refer to the details of each record. To be specific, the link items r1 to r5 for referring to the details of each record and the link item p11 for transitioning pages of the search result are more likely to be selected than the sort item c11.

On the other hand, in the example of FIG. 6(*b*), the web page shows a result of searching with a model number of a product such as "A111" as search criteria d21. In the case where search with a model number is performed like this, the search result includes only one type of record as shown in the records No. 1 to No. 5. As in this case, when there are only a few variations of records in a search result, the sort item c21 for comparing attribute information contained in each record such as a price, for example, is likely to be selected.

FIG. 7 is a view showing an example of an operation pattern table that stores an operation history of operations performed in the user terminal T in accordance with variations of records in a search result. Specifically, the operation pattern table shown FIG. 7 is a table that shows the tendency of item selection operations performed in accordance with variations of records in a search result as described by reference to FIGS. 6(a) and 6(b), which can be generated in advance based on a history of operations performed in the user terminal T. Note that the operation pattern table may be stored in the operation pattern table storage unit 23.

For example, in the case where records with at least five variations are included in a search result as shown in FIG. 6(a), the determination unit 12 refers to the operation pattern table of FIG. 7 and extracts the operation patterns which are associated with the number of variations of records "5 (5 or more)" and where the number of times is a specified value or more. When the specified value for the number of times is set to 30 or more, for example, the determination unit 12 extracts "selection of the record 1", "selection of the record 2", "selection of the record 3", "selection of the record 4" and "display of the next page" as the operation pattern. Then, the generation unit 13 generates a data set to be transmitted to the user terminal T according to the selection of the selection item "Next" for displaying the next page in the link item p11 and the link items r1 to r4 and stores it into the data set storage unit 22.

On the other hand, in the case where records with one variation are included in a search result as shown in FIG. 6(b), the determination unit 12 refers to the operation pattern table of FIG. 7 and extracts the operation patterns which are associated with the number of variations of records "1" and where the number of times is a specified value or more. When the specified value for the number of times is set to 30 or more, for example, the determination unit 12 extracts "sorting by price" as the operation pattern. Then, the generation unit 13 generates a data set to be transmitted to the user terminal T according to the selection of the sort item c21 and stores it into the data set storage unit 22.

In this manner, by determining the prefetch item based on an operation history of operations performed in the user terminal in accordance with variations of records included in a search result in response to a search request from the user terminal, it is possible to generate in advance a data set related to items that are likely to be selected in the search result.

Further, the generation unit 13 may further generate a data set to be transmitted to the user terminal in response to selection of at least some of the selectable items contained in the web page to be displayed on the user terminal T based on one data set generated by the generation unit 13 as a data set in the next hierarchy of the one data set. This generation processing is described hereinafter with reference to FIGS. 4 and 5.

As described above, when a search result list (see FIG. 4) is provided to the user terminal T, the generation unit 13 generates a data set to be transmitted to the user terminal T in response to selection of the link item r1 for the operation pattern such as "selection of the record 1", for example, and stores it into the data set storage unit 22. This data set is composed of a group of data for displaying the detailed information of the record 1.

In this case, regardless of whether the data set related to the link item r1 is transmitted to the user terminal T, the generation unit 13 may further generate a data set to be transmitted to the user terminal in response to selection of at least some of the selectable items contained in the web page showing the detailed information of the record 1 as a data set in the next hierarchy. Referring to FIG. 5, it shows that there is a certain degree of tendency that an operation pattern such as "selection of the record 2" is performed after the first operation pattern such as "selection of the record 1" is performed, and therefore the generation unit 13 generates a data set composed of a group of data for displaying the detailed information of the record 2 and stores it into the data set storage unit 22.

Further, it shows that, when a data set for displaying the detailed information of the record 2 is generated, there is a certain degree of tendency that an operation pattern such as "selection of the record 3" is performed after the first operation pattern such as "selection of the record 2" is performed, and therefore the generation unit 13 may generate a data set for displaying the detailed information of the record 3 as a data set in the next hierarchy and store it into the data set storage unit 22.

In this manner, the generation unit 13 can generate data sets to be transmitted to the user terminal T in response to selection of an item over a plurality of hierarchies. Then, the generation unit 13 can adjust the number of hierarchies of a data set to be generated in accordance with the processing load of the data provision device 1. For example, the generation unit 13 may generate a data set in three hierarchies when a value indicating the processing load is less than a specified value, and may generate a data set in two hierarchies when a value indicating the processing load is equal to or more than the specified value. By adjusting the number of hierarchies to be generated according to the state of a processing load of the data provision device 1, it is possible to reduce the processing load for generation of data sets in a plurality of hierarchies. Note that a value indicating the processing load of the data provision device 1 can be calculated based on the time required to generate one data set, for example.

Further, the generation unit 13 may generate a data set for the number of user terminals T accessing the data provision device 1 in accordance with the processing load of the data provision device 1. The data provision device 1 according to this embodiment provides a web page in response to a request from a plurality of user terminals T and generates a data set to be transmitted to the user terminals T according to selection of items to be contained in a web page as shown in FIG. 1. When access is being made from a plurality of user terminals T, the generation unit 13 can adjust the number of user terminals T for which a data set is to be generated in accordance with the processing load of the data provision device 1. For example, the generation unit 13 may generate a data set for 100 user terminals T when a value indicating the processing load is less than a specified value, and may generate a data set for 50 user terminals T when a value indicating the processing load is equal to or more than the specified value. In this manner, by adjusting the number of user terminals T for which a data set is to be generated, it is possible to reduce the processing load when providing a data set to a plurality of user terminals.

Further, as described earlier, the generation unit 13 can generate data sets for a plurality of prefetch items to be contained in one web page, a plurality of prefetch items in a plurality of hierarchies, and a plurality of prefetch items for a plurality of users. In the case of sequentially generating a plurality of data sets for a plurality of prefetch items, the generation unit 13 may set a time interval to perform generation of a data set to a time in accordance with the processing load of the data provision device 1. For example, the generation unit 13 may set the time interval to perform generation of a data set to t1 when a value indicating the processing load is less than a specified value, and may set the time interval to perform generation of a data set to t2, which is longer than t1, when a value indicating the processing load is equal to or more than the specified value. By adjusting the time interval to perform generation of a data set in accordance with the processing load of the data provision device 1, it is possible to reduce the processing load when sequentially generating a plurality of data sets.

Further, when, in response to a search operation based on search criteria set in the user terminal T, providing a search result which includes a plurality of records that match the search criteria as a web page to the user terminal T, the determination unit 12 may determine a record included in the search result as the prefetch item in accordance with a search score indicating the degree of matching of the record with the search criteria. Specifically, because a record with a high search score is likely to be selected by a user, the determination unit 12 can determine the tendency of selection based on the search score. By determining the prefetch item in this manner, it is possible to generate a data set for the item that is likely to be selected by many users. Note that the search score may be a value indicating the number of times the record has been searched for.

Figure 8:
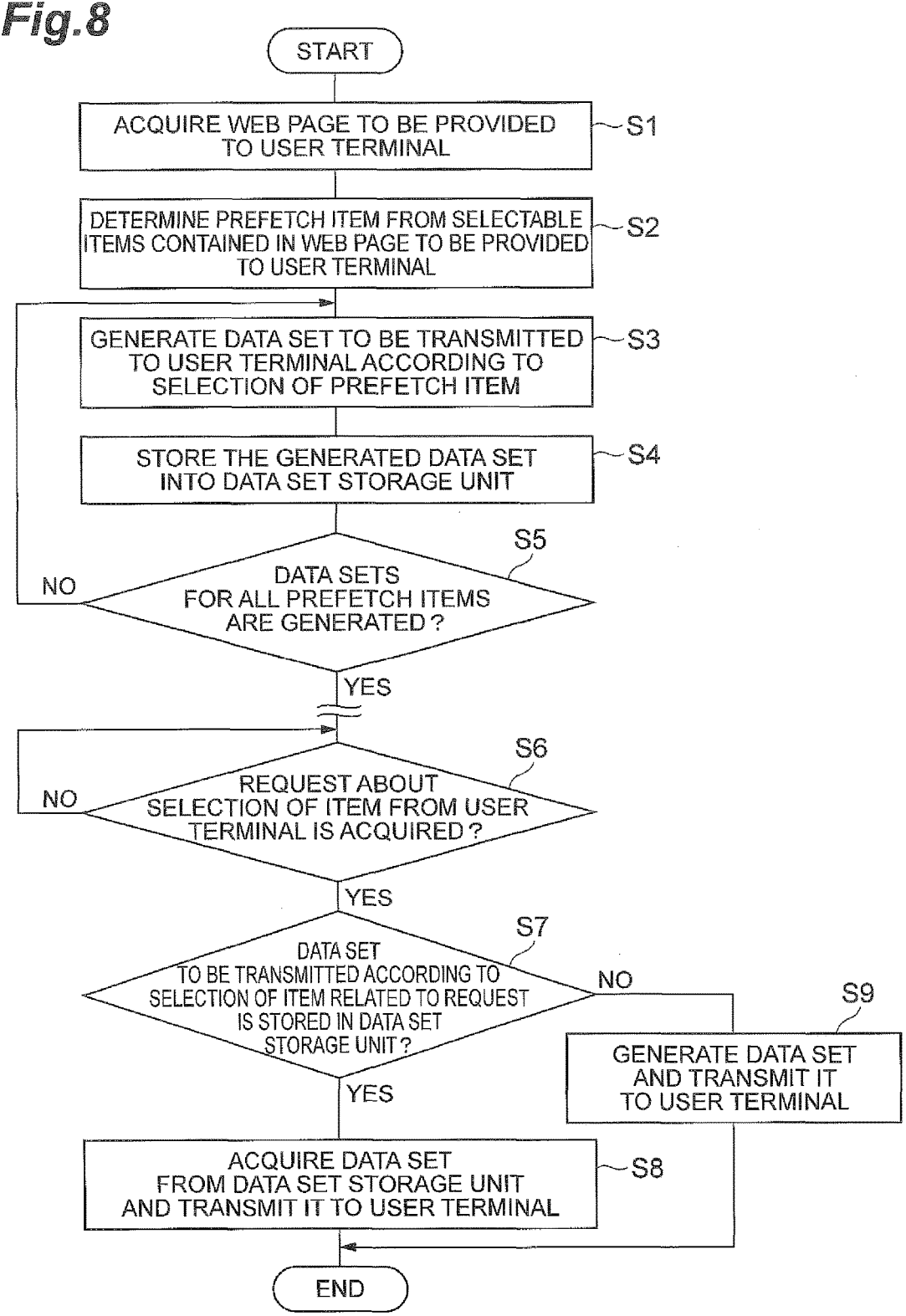
FIG. 8 is a flowchart showing an example of a process of a data provision method.

A data provision method according to this embodiment is described hereinafter with reference to FIG. 8. FIG. 1 is a flowchart showing an example of a process of a data provision method in the data provision device 1 shown in FIG. 1.

First, the determination unit 12 acquires a web page to be provided to the user terminal T for the purpose of determining a prefetch item (S1). This web page is generated by the generation unit 13 by referring to the content database 21 based on a request from the user terminal T which is acquired by the request acquisition unit 11. Next, the determination unit 12 determines at least some of the selectable items contained in the web page to be provided to the user terminal T as a prefetch item based on an event that can occur in the user terminal to which the web page is provided (S2). The prefetch item is determined based on the tendency of selecting an item on the web page by a user, for example. To be more specific, the prefetch item is determined according to the operation history about the selection of an item on the web page.

Then, the generation unit 13 generates a data set composed of a group of data to be transmitted to the user terminal according to selection of the prefetch item determined by the determination unit 12 (S3). The generation unit 13 then stores the generated data set into the data set storage unit 22 (S4). The processing of Steps S3 to S5 is repeated until data sets for all of the prefetch items determined by the determination unit 12 are generated (S5).

In Step S6, the request acquisition unit 11 determines whether a request about selection of an item from the user terminal T is acquired or not (S6). When a request from the user terminal T is acquired, the process proceeds to Step S7. In Step S7, the generation unit 13 determines whether a data set to be transmitted according to the selection of an item related to the request is stored in the data set storage unit 22 or not. When it is determined that the data set to be transmitted is stored in the data set storage unit 22, the process proceeds to Step S8. On the other hand, when it is not determined that the data set to be transmitted is stored in the data set storage unit 22, the process proceeds to Step S9.

In Step S8, the generation unit 13 acquires the data set to be transmitted the user terminal T from the data set storage unit 22, and the transmitting unit 14 transmits the acquired data set to the user terminal T (S8). On the other hand, in Step S9, the generation unit 13 refers to the content database 21 and generates a data set corresponding to the request about selection of an item from the user terminal T, and the transmitting unit 14 transmits the generated data set to the user terminal T (S9).

Figure 9:
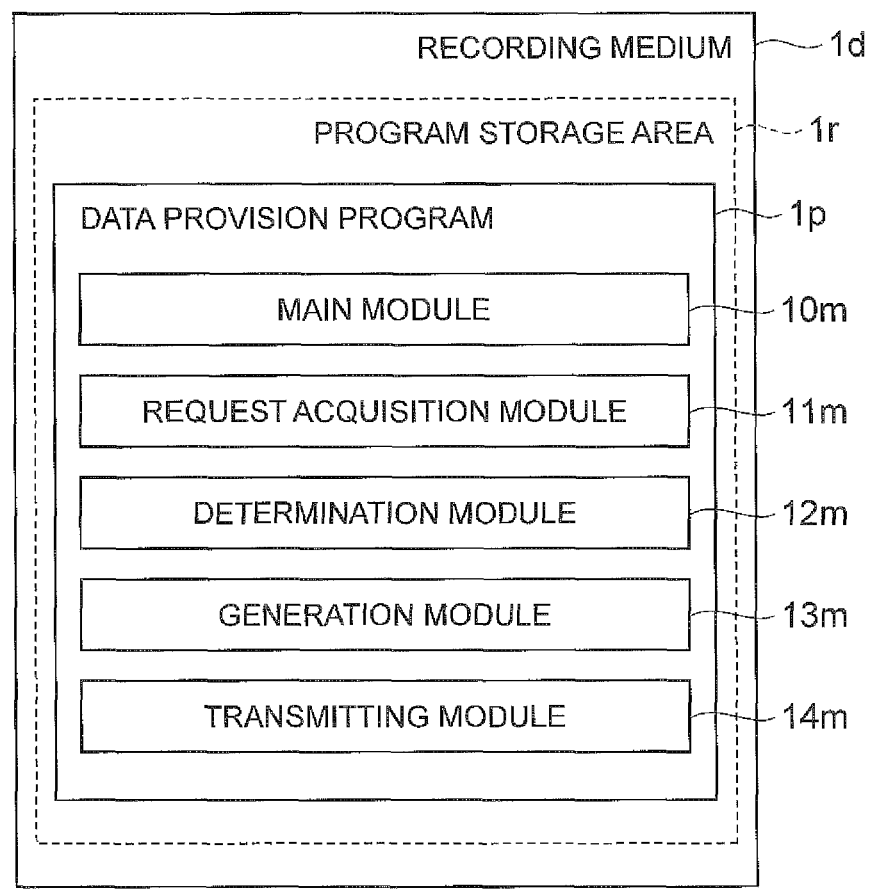
FIG. 9 is a view showing a configuration of a data provision program.

A data provision program that causes a computer to function as the data provision device 1 is described hereinafter with reference to FIG. 9. A data provision program 1$p$ includes a main module 10$m$, a request acquisition module 11$m$, a determination module 12$m$, a generation module 13$m$, and a transmitting module 14$m$.

The main module 10$m$ is a part that exercises control over the data provision processing. The functions implemented by executing the request acquisition module 11$m$, the determination module 12$m$, the generation module 13$m$ and the transmitting module 14$m$ are respectively equal to the functions of the request acquisition unit 11, the determination unit 12, the generation unit 13 and the transmitting unit 14 of the data provision device 1 shown in FIG. 2.

The data provision program 1$p$ is provided through a recording medium 1$d$ such as CD-ROM or DVD-ROM or semiconductor memory, for example. Further, the data provision program 1$p$ may be provided as a computer data signal superimposed onto a carrier wave over a communication network.

According to the data provision device 1, the data provision method and the data provision program 1$p$ described above, because the data provision device 1 can recognize the content of a web page to be provided to the user terminal T, it can generate a data set to be transmitted to the user terminal T in advance according to selection of an item contained in the web page to be provided to the user terminal T. Then, when selection of an item from the user terminal T is received, the previously generated data set corresponding to the item is transmitted to the user terminal T, and it is thereby possible to provide the data set to the user terminal T without requiring the time to generate the data set. Further, because the technique that a user terminal T prefetches data corresponding to a link item contained in a web page from a web server performs prefetching of data regardless of whether the item is actually selected or not, unnecessary traffic occurs in the network. On the other hand, in this embodiment, because the previously generated data set is transmitted to the user terminal according to selection of an item in the user terminal T, traffic in the network can be reduced to the minimum necessary.

An embodiment of the present invention is described in detail above. However, the present invention is not limited to the above-described embodiment. Various changes and modifications may be made to the present invention without departing from the scope of the invention.

REFERENCE SIGNS LIST

1 . . . data provision device, 11 . . . request acquisition unit, 12 . . . determination unit, 13 . . . generation unit, 14 . . . transmitting unit, 20 . . . databases, 21 . . . content database, 21, . . . content database, 22 . . . data set storage unit, 23 . . . operation pattern table storage unit, 100 . . . data provision system, 1$d$ . . . storage medium, 1$p$ . . . data provision program, 10$m$ . . . main module, 11$m$ . . . request acquisition module, 12$m$ . . . determination module, 13$m$ . . . generation module, 14$m$ . . . transmitting module, N . . . network, T . . . user terminal

What is claimed is:

1. A data provision device for providing a web page in response to a search request from a user terminal, comprising:

at least one memory operable to store computer program code;

at least one processor operable to access said program code and operate according to said program code, said program code including:

search code configured to cause at least one of said at least one processor to provide a first web page to the user terminal based on the search request, wherein:
the first web page lists a plurality of records,
a first record of the plurality of records indicates a first value of an attribute, and
a second record of the plurality of records indicates a second value of the attribute, determination code configured to cause at least one of said at least one processor to
determine at least some of selectable items contained in a second web page to be provided to the user terminal as a prefetch item based on a number of variations of the attribute;

generation code configured to cause at least one of said at least one processor to generate a data set composed of a group of data to be transmitted to the user terminal according to selection of the prefetch item determined; and transmitting code configured to cause at least one of said at least one processor to, when selection of an item is received from the user terminal, transmit to the user terminal a data set corresponding to the item and generated using said generation code.

2. The data provision device according to claim 1, wherein
the determination code is configured to cause the at least one of said at least one processor to determine the prefetch item based on an operation history about selection of an item on a web page.

3. The data provision device according to claim 2, wherein
when a first operation pattern related to the search request is performed by the user terminal, the determination code causes the at least one of said at least one processor to determine as the prefetch item an item selected in a second operation pattern having been performed after the first operation pattern, wherein the second operation pattern having been performed at a frequency exceeding a specified value.

4. The data provision device according to claim 2, wherein
wherein the determination code causes the at least one of said at least one processor to determine the prefetch item based in part on the operation history indicating a tendency of selecting an item.

5. The data provision device according to claim 1, wherein
the generation code is configured to cause the at least one of said at least one processor to generate a data set to be transmitted to the user terminal in response to selection of at least some of selectable items contained in a web page to be displayed on the user terminal based on one data set generated as a data set in a next hierarchy of the one data set, and generate a data set in the number of hierarchies in accordance with a processing load of the data provision device.

6. The data provision device according to claim 1, wherein
the generation code is configured to cause the at least one of said at least one processor to generate a data set for a number of user terminals accessing the data provision device in accordance with a processing load of the data provision device.

7. The data provision device according to claim 1, wherein
when sequentially generating a plurality of data sets for a plurality of prefetch items, the generation code causes the at least one of said at least one processor to set a time interval to perform generation processing to a time in accordance with a processing load of the data provision device.

8. The data provision device of claim 1, wherein the attribute is product name.

9. The data provision device of claim 1, wherein the attribute is product model number.

10. The data provision device of claim 1, wherein the attribute is product price.

11. A data provision method in a data provision device including at least one computer processor for providing a web page in response to a search request from a user terminal, comprising:
providing a first web page to the user terminal based on the search request, wherein:
the first web page lists a plurality of records,
a first record of the plurality of records indicates a first value of an attribute, and
a second record of the plurality of records indicates a second value of the attribute,
determining at least some of selectable items contained in a second web page to be provided to the user terminal as a prefetch item based on a number of variations of the attribute;
generating a data set composed of a group of data to be transmitted to the user terminal according to selection of the prefetch item determined; and
when selection of an item is received from the user terminal, transmitting to the user terminal a data set generated and corresponding to the item.

12. A data provision method in a data provision device including at least one computer processor for providing a web page to a user terminal, comprising:
receiving a search request based on search criteria set in the user terminal, wherein the search request is associated with e-commerce shopping;
providing a first web page to the user terminal based on the search request, wherein: the first web page lists a plurality of records,
a first record of the plurality of records indicates a first value of an attribute, and
a second record of the plurality of records indicates a second value of the attribute,
determining, based on a number of variations of the attribute, prefetch item associated with a sort item, wherein the sort item includes a sorting by price; and
providing a second search result including a plurality of records matching the search criteria as the web page to the user terminal, wherein the second search result is based on the sort item.

* * * * *